United States Patent [19]

Murray

[11] 4,433,598
[45] Feb. 28, 1984

[54] RING JOINT MACHINING TOOL

[75] Inventor: Jack T. Murray, San Jose, Calif.

[73] Assignee: United Centrifugal Pumps, San Jose, Calif.

[21] Appl. No.: 357,987

[22] Filed: Mar. 15, 1982

[51] Int. Cl.³ .............................................. B23B 5/16
[52] U.S. Cl. ........................................ 82/2 E; 30/97; 82/4 C
[58] Field of Search .................... 82/2 E, 4 R, 4 C; 30/97

[56] References Cited

U.S. PATENT DOCUMENTS

| 3,124,024 | 3/1964 | Pittman | 82/4 R |
| 3,630,109 | 12/1971 | MacMichael | 82/4 C |
| 3,818,786 | 6/1974 | Leshem | 82/4 C |
| 4,050,335 | 9/1977 | Gilmore | 82/4 C |

Primary Examiner—W. D. Bray
Attorney, Agent, or Firm—Robert G. Slick

[57] ABSTRACT

A ring joint machining tool for simultaneously machining the inner and outer surfaces of a V-groove, said tool having a rotating body member with a sliding tool block holding two tools and having cam means associated with said tool block whereby said tool block moves in a radial direction as the tool is rotated and urged into contact with a workpiece.

6 Claims, 5 Drawing Figures

RING JOINT MACHINING TOOL

SUMMARY OF THE INVENTION

The present invention was primarily developed for the purpose of putting a fine surface finish in a V-groove of the flange of a high pressure oil pump. In a high pressure oil pump the V-groove must have a very fine surface finish so that a stainless steel O-ring will form a perfect seal. However, it will be obvious that it is a tool of great versatility and can be used for a variety of other purposes when one wishes to machine or finish a V-groove in a fixed workpiece.

The flanges of oil pumps or pressure vessels form part of a large casting which may weigh several tons so it is impractical to rotate the workpiece, as in a lathe, but instead it is necessary that the workpiece be fixed and the tool moved. In the past various methods have been employed to form and finish such grooves but none has proved satisfactory.

In accordance with the present invention, a relatively simple tool is provided which will surface both the inner and outer surfaces of a V-groove at the same time.

Various additional objects and features of the present invention will be brought out in the balance of the specification.

DESCRIPTION OF THE PREFERRED EMBODIMENTS

Figure 2:
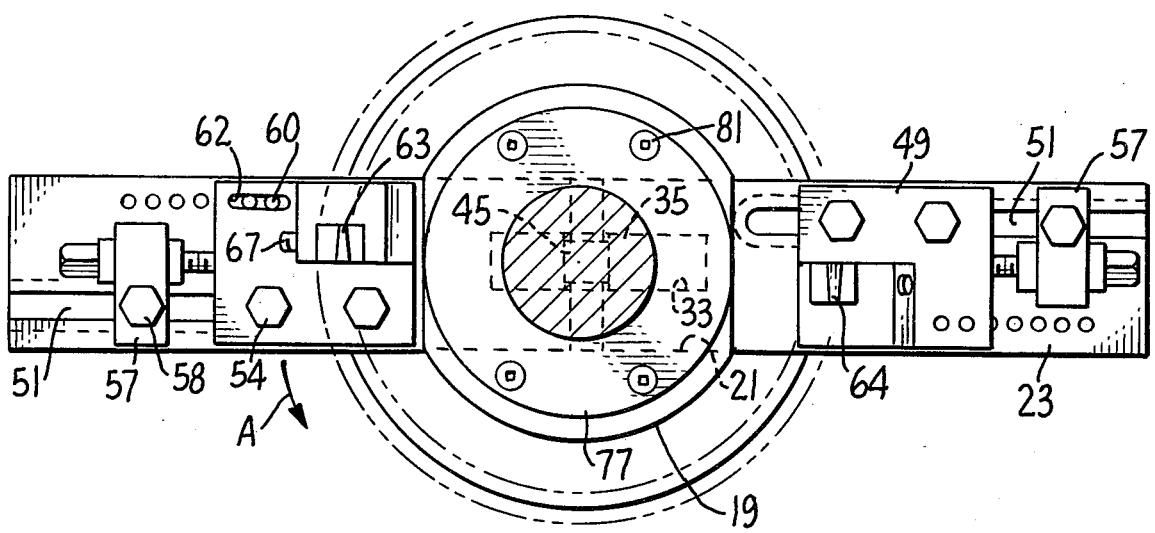
FIG. 2 is a view on the line 2—2 of FIG. 1.

The tool of the present invention is primarily designed to simultaneously put a fine surface finish on the inner wall 5 and the outer wall 7 of a V-groove 9 in a workpiece 11, which in the normal application of the invention would be a flange on an oil pump, not shown. The tool of the present invention is normally mounted on a flange holder 13 by means of the cap screws 15 on a spindle 17. Spindle 17 is adapted to be rotated as shown by arrow A as well as advanced toward a workpiece, as is shown by arrow B, by means well known to those skilled in the art.

The tool includes a body member 19 having a radial slot 21 in which a sliding tool block 23 is mounted for sliding motion. The body 19 also has a large cylindrical bore 25 in which a pistonlike cam block cap 27 can slide and below this a smaller bore 29 in which spring 31 is mounted, urging the cam block 27 outwardly, toward the workpiece 11.

The sliding tool block 23 has a central rectangular slot 33 in which the cam body 35 is mounted in a sliding fit. Cam body 35 is held on the cam block cap 27 by means of cap screws 37. The cam body has an angling cam slot 39 and the angle of the slot with respect to the tool is the same, or a complement of, the angle of the walls of the V-grooves 5 and 7.

The sliding tool block has a hole 41 at the center and at right angles to slot 33 and a cam roller pin 43 fits in this hole. The cam roller pin 43 has a needle bearing 45 mounted thereon, the outer race of bearing 45 serving as a cam follower in slot 39. It will be obvious that if one moves the cam body in and out, a transverse motion will be imparted to the sliding tool block.

The sliding tool block is also provided with two adjustable tool holders 47 and 49 and, since these are essentially mirror images of each other, only one is described in detail. Tool block 47 is mounted for sliding motion over a T-shaped slot 51 by means of cap screws 54 which fit into tee nuts 55 so that the tool can be slid back and forth and clamped in a desired position by tightening the screws 54. Additionally, a microadjustment is provided by means of the microadjustment screw block 57 which is similarly held over the T-groove 51 by the cap screw 58 fitting into tee nut 59. A precision screw 61 extends between tool block 47 and the adjustment block 57 so that one can roughly line up the proper position for the tool block 47 then tighten the cap screw 58 and make a precise adjustment by turning the adjustment screw 61 and then finally tightening the nuts 54. Further stability can be achieved by tightening screws 60 which extend over slot 62.

Each of the tool holders 47 and 49 has a cutting tool 63 and 64, respectively, in a angling slot 65 in the tool holder and held in place by means of cap screws 67. An adjustment screw 69 is provided for positioning the cutting tool.

The cam body 35 is provided with a stop plate 71 mounted on a thrust bearing 73 and held in place by a retaining pin 75. The cam body is mounted in sliding relationship within body cap 77 which is held to the body 19 by means of cap screws 81.

Figure 1:
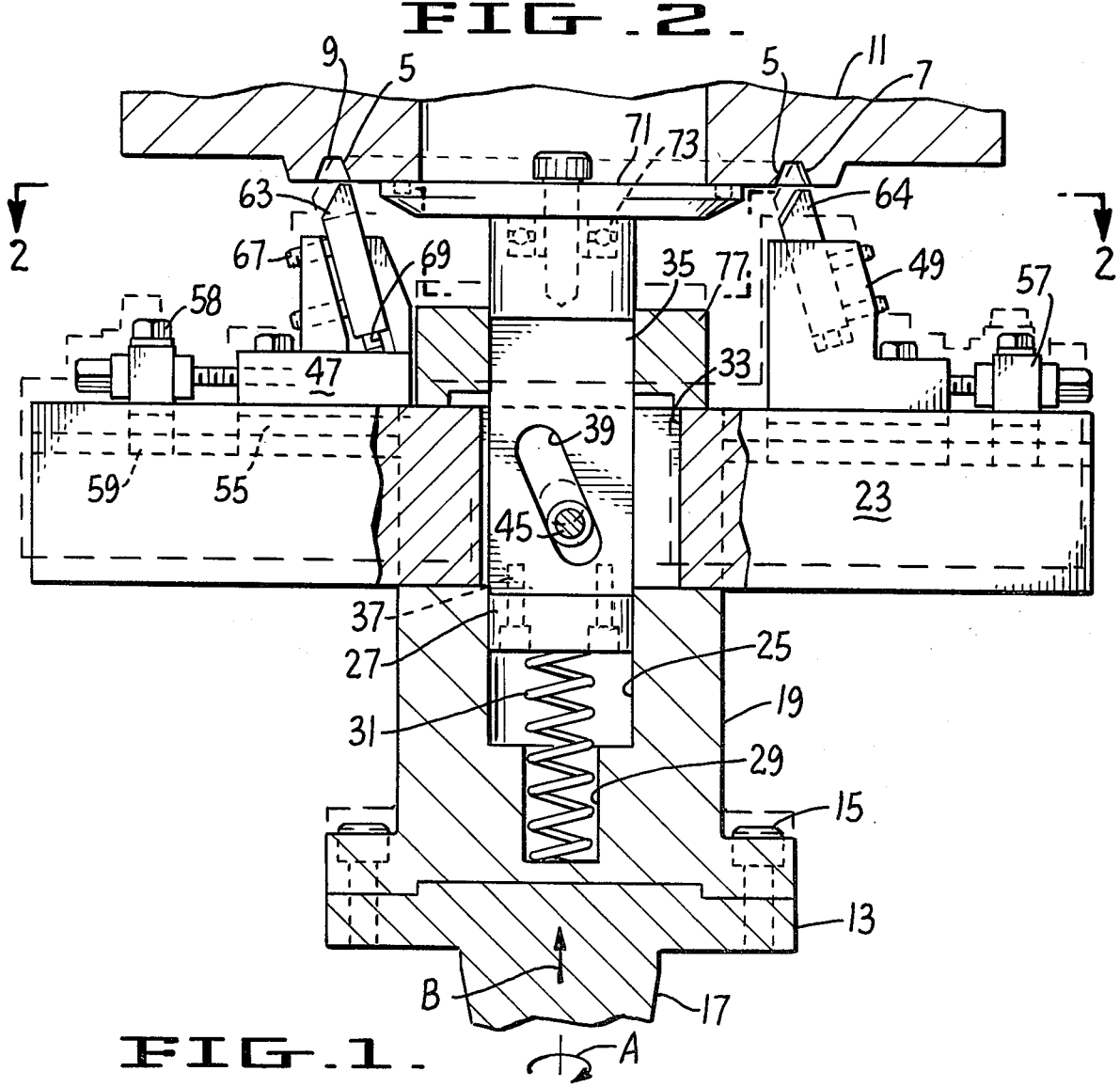
FIG. 1 is a side view, partly in section, of a tool embodying the present invention.
Figure 3:
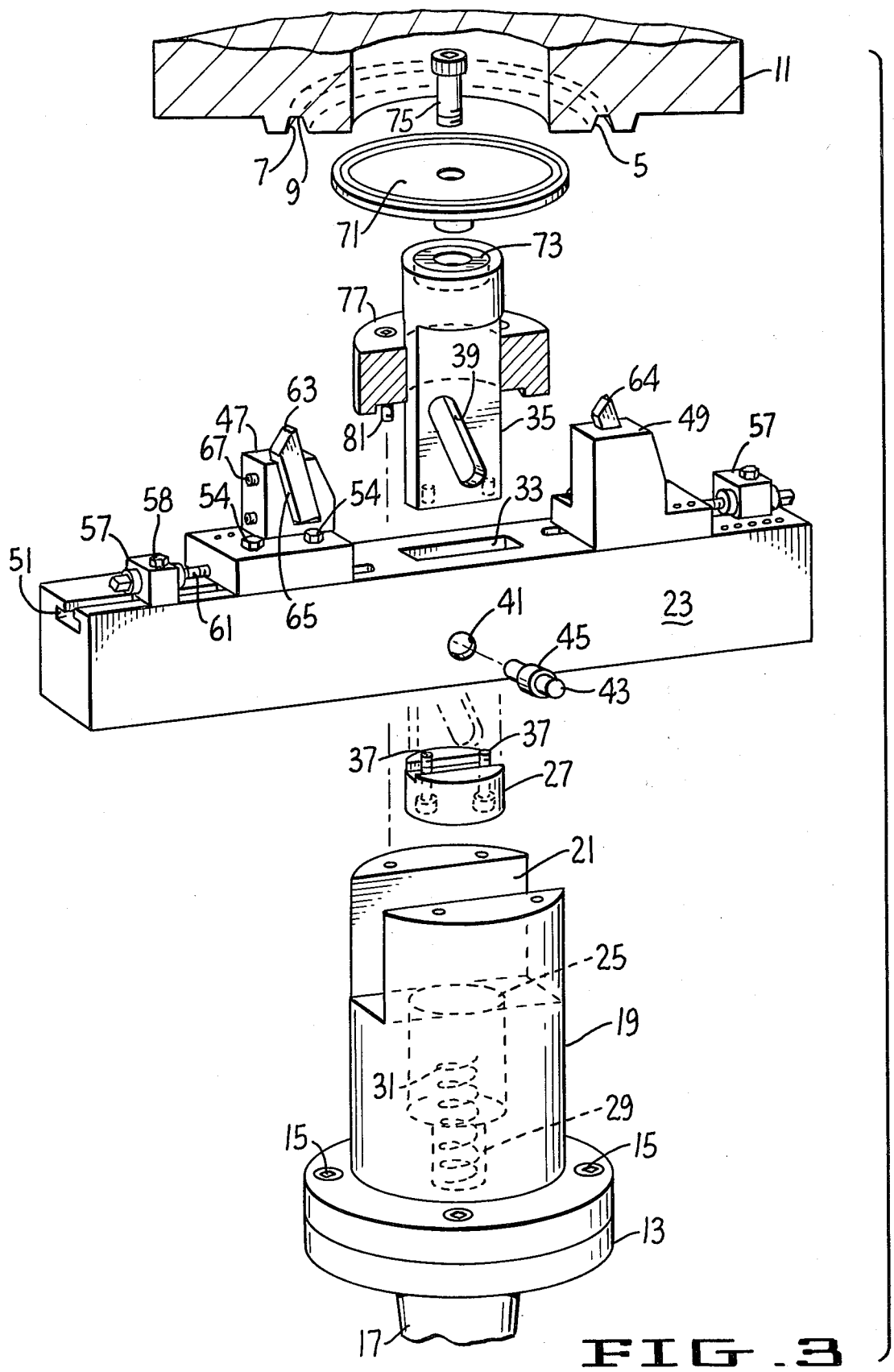
FIG. 3 is an exploded perspective view of the tool.

The actual operation of the tool in practice can be best seen in FIG. 1. At the start of an operation, the flat bottomed V-groove 9 has been roughly machined and the parts are placed as is shown in solid lines with plate 71 in contact with workpiece 11 and the cutting tools 63 and 64 in contact with the inner wall 5 and the outer wall 7, respectively. Spindle 17 is now rotated as shown by arrow A and advanced toward the workpiece as shown by arrow B. Now as the tool is advanced, the stop plate 71 is held stationary against workpiece 11 and advancement of the tool causes the cam body to be pushed into the tool, against the action of spring 31 moving the sliding tool block 23 to the left so that ultimately the parts reach the position shown in phantom in FIG. 1. Thus, a fine surface finish is simultaneously produced on both walls of the V-groove in a simple and precise manner.

Figure 4:
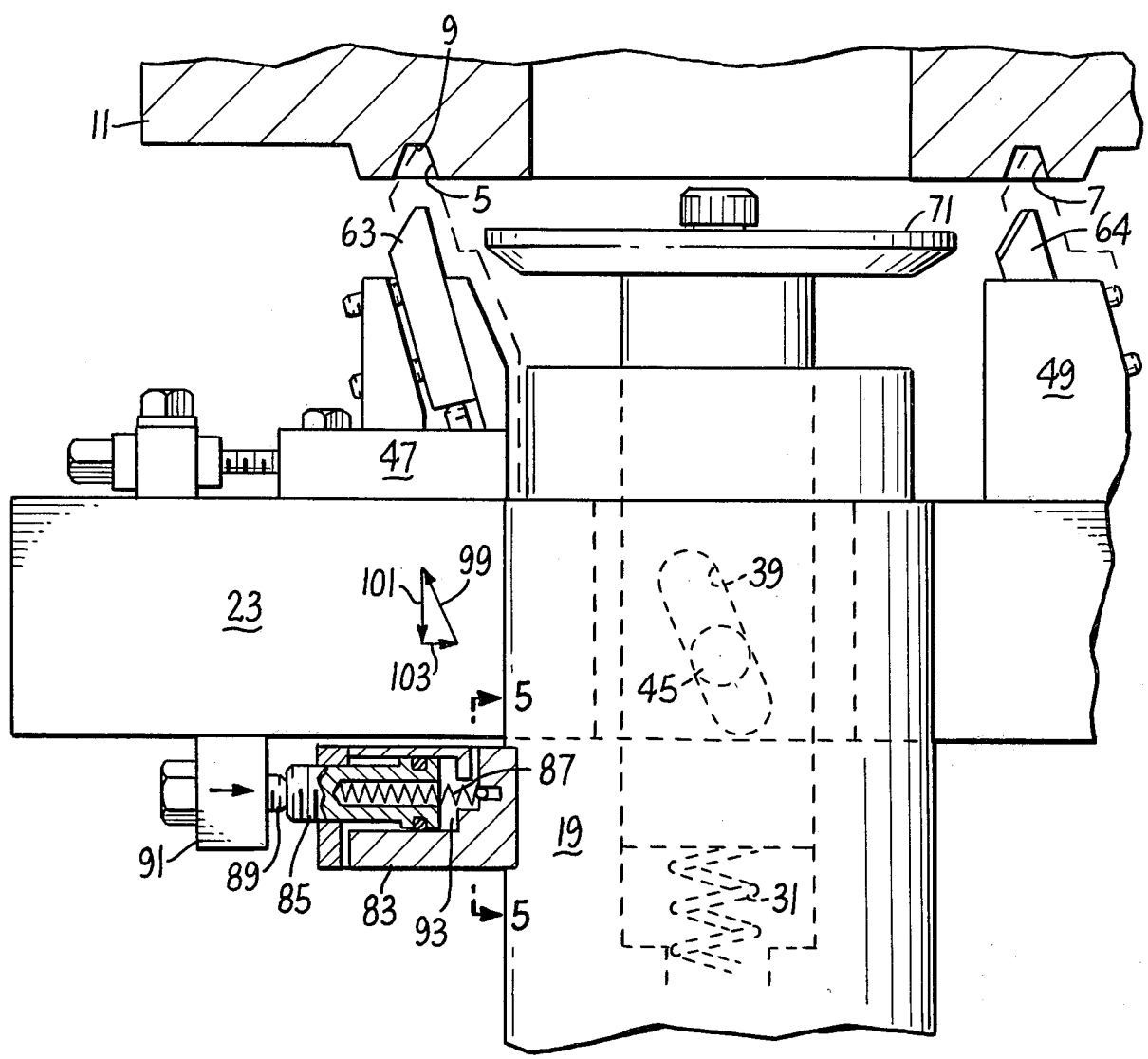
FIG. 4 is a side view of a modified form of the device which prevents possible scratches on the finished work during the return stroke.
Figure 5:
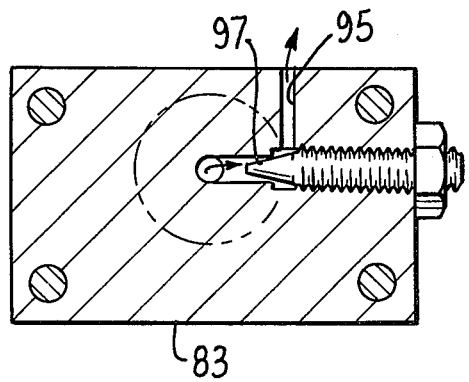
FIG. 5 is a section on the line 5—5 of FIG. 4.

The tool thus far described is satisfactory for most purposes but on high precision work, it has been found that as the tool retracts, slight spiral marks might be left on the finished machined surface which would be unacceptable in certain applications. In such instances, the modifications shown in FIGS. 4 and 5 can be employed. In order to remedy this, an air cylinder 83 is mounted on the body 19. Cylinder 82 has a piston 85 therein which is normally urged outwardly by means of spring 87. The end of piston 85 bears against an adjustable screw 89 in block 91 mounted on the sliding tool block 23. The space 93 behind the piston is open to the atmosphere through a small passage 95 and the effective size of the passage can be controlled by means of a needle valve 97. When the tool is on the cutting stroke, it follows an angular path 99 as it makes its fine finishing cuts in the two grooves. At the same time, spring 87 causes the piston 85 to move to the left, increasing the volume of the space 93. Now as the body 19 retracts, the tool block 23 cannot immediately retract because of the buildup of air pressure in the space 93. Thus, on the return stroke, the cutting tools follow the path 101. Now as the air is gradually bled out of chamber 93, the tool block 23 can retract to the right as indicated on the diagram at 103. Thus, there is no possibility of the tool scratching the work upon retraction.

Although a specific embodiment of the invention has been illustrated, it will be obvious to those skilled in the art that many variations can be made in the exact structure shown without departing from the spirit of this invention.

I claim:

1. A ring joint machining tool for machining the sides of a ring joint in a fixed workpiece comprising in combination:
   (a) a body member mounted for rotation at right angles to a workpiece,
   (b) a tool block mounted in sliding relationship in said tool block at a right angle to the axis of rotation,
   (c) a pair of tool holders on said tool block one mounted on each side of said body member, each holder having a cutting tool therein,
   (d) a cam body having an angling slot mounted for sliding axial movement in said body member,
   (e) a cam follower mounted on said tool block and extending into the slot of the cam body,
   (f) a stop plate mounted between said tool holders attached to said cam body,
   (g) means for biasing said cam body toward a workpiece,
   (h) means for rotating said body member and moving said body member toward a workpiece whereby,
   (i) said stop plate engages said workpiece moving said stop plate relative to said body member as said body member moves toward the workpiece, pushing on said cam body causing said tool block to move in a radial direction.

2. The ring joint machining tool of claim 1 having a thrust bearing between said stop plate and said cam body.

3. The tool of claim 1 having micrometer means between said tool block and each of said tool holders whereby the position of the tool holders can be precisely adjusted on the tool block.

4. The tool of claim 1 wherein the biasing means urging said cam body toward a workpiece comprises a spring.

5. The tool of claim 1 wherein one of said tool holders is mounted with a cutting tool to machine one side of a V-shaped slot and the other holder has a tool set at an angle to machine the opposite side of said V-shaped slot.

6. The tool of claim 1 having pneumatic dampening means whereby air is compressed as said tool block moves in a radial direction during a cutting stroke and is prevented from immediately retracting at the completion of the cutting stroke.

* * * * *